(12) United States Patent
Bonnet et al.

(10) Patent No.: US 8,053,502 B2
(45) Date of Patent: Nov. 8, 2011

(54) PVDF-BASED EXTRUSION-AIDING AGENT

(75) Inventors: Anthony Bonnet, Beaumont le Roger (FR); Johann Laffargue, Bernay (FR); Karine Triballier, Bosrobert (FR); Francois Beaume, Bernay (FR)

(73) Assignee: Arkema France, Colombes (FR)

( * ) Notice: Subject to any disclaimer, the term of this patent is extended or adjusted under 35 U.S.C. 154(b) by 33 days.

(21) Appl. No.: 12/295,954

(22) PCT Filed: Mar. 20, 2007

(86) PCT No.: PCT/FR2007/050962
§ 371 (c)(1),
(2), (4) Date: Apr. 27, 2010

(87) PCT Pub. No.: WO2007/113424
PCT Pub. Date: Oct. 11, 2007

(65) Prior Publication Data
US 2010/0204375 A1  Aug. 12, 2010

(30) Foreign Application Priority Data
Apr. 5, 2006 (FR) ..................................... 06 02973

(51) Int. Cl.
*C08K 5/51* (2006.01)
(52) U.S. Cl. ........ 524/128; 524/140; 524/141; 524/145; 524/115
(58) Field of Classification Search ................ 524/140, 524/145, 141, 115, 128
See application file for complete search history.

(56) References Cited

U.S. PATENT DOCUMENTS

| | | | |
|---|---|---|---|
| 4,496,677 A * | 1/1985 | Briggs et al. | 524/108 |
| 4,863,983 A | 9/1989 | Johnson et al. | |
| 6,214,469 B1 | 4/2001 | Sukhadia et al. | |
| 6,294,604 B1 * | 9/2001 | Focquet et al. | 524/433 |
| 6,355,359 B1 | 3/2002 | Sukhadia et al. | |
| 2003/0225194 A1 | 12/2003 | Coffy et al. | |
| 2005/0010644 A1 | 1/2005 | Brown et al. | |
| 2005/0070644 A1 | 3/2005 | Tikuisis et al. | |
| 2005/0113494 A1 | 5/2005 | Bobsein et al. | |
| 2006/0025523 A1 | 2/2006 | Barriere et al. | |

* cited by examiner

*Primary Examiner* — Ling Choi
(74) *Attorney, Agent, or Firm* — Thomas F. Roland

(57) ABSTRACT

The invention concerns to a composition comprising: at least one fluorinated polymer (A), at least one interfacing agent (B), and at least one stabilizer (C) of formula (I)

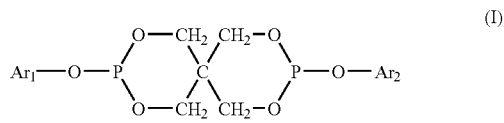

wherein $Ar_1$ and $Ar_2$ represent an aryl group. The composition is used as an agent for extruding a thermoplastic polyolefin or resin. The invention also concerns an extruding method consisting in: (i) contacting in the solid phase a composition as defined above with a thermoplastic polyolefin or a thermoplastic resin; (ii) then extruding the mixture obtained in (i) in the form of a film, a tube, a profiled section or a hollow body.

17 Claims, 1 Drawing Sheet

PVDF-BASED EXTRUSION-AIDING AGENT

This application claims benefit, under U.S.C. §119 or §365 of French Application Number FR 06.02973, filed Apr. 5, 2006; and PCT/FR2007/050962 filed Mar. 20, 2007.

FIELD OF THE INVENTION

The present invention relates to a processing aid, namely an additive that makes it possible to reduce or eliminate surface defects that appear when a thermoplastic resin, in particular a polyolefin, is extruded. The processing aid (or extrusion agent in the rest of the application) comprises at least one fluoropolymer (A), at least one interfacial agent (B) and at least one stabilizer (C), optionally diluted with a polyolefin (D) so as to form a masterbatch. The invention also relates to the use of the extrusion agent as well as to the extrusion method.

SUMMARY OF THE INVENTION

During the extrusion of thermoplastic resins, particularly polyolefins, especially in the form of films, flow irregularities may appear at the outlet from the extruder die leading to surface defects and sometimes impairment of mechanical and/or optical properties. This phenomenon appears especially when a critical shear rate is exceeded. Below this critical rate, extrudates are smooth, while above this rate surface defects are observed. These defects, that are called <<melt fracture>>, exist in several forms. At a shear rate slightly above the critical rate, films obtained by extrusion blowmoulding lose their transparency and gloss. For distinctly higher rates (that is to say at a higher productivity) homogeneity defects appear with smooth zones in a rough surface. These defects significantly reduce the optical and/or mechanical properties of the film. The same phenomena can be observed on extruded rods. When the surface of the rods loses its gloss and becomes matt and rough, it is often compared to "orange peel".

An extrusion agent may be added when a thermoplastic resin is extruded, which makes it possible to reduce surface defects. However, it is necessary that the addition of the extrusion agent does not lead to a deterioration in the yellowing index of the extruded resin.

The Applicant has surprisingly found that it is possible to reduce or eliminate extrusion defects without causing deterioration of the yellowing index of the extruded resin.

American patent U.S. Pat. No. 6,294,604 B1 describes an extrusion agent comprising a fluoropolymer, a polyethylene oxide (PEG), magnesium oxide and optionally a stabilizer. The stabilizer may be a phenolic or phosphorus-containing derivative or a lactone. The examples describe the use of B-225 which is a mixture of Irgafos 168 and Irganox 1010.

American patents U.S. Pat. No. 6,214,469 and U.S. Pat. No. 6,355,359 describe the stabilization of PE films with the aid of Irganox 1010 (tetrakis[methylene 3-(3,5-ditertbutyl 4-hydroxy-phenyl propionate)]), PEP-Q (tetrakis-(2,4-di-tertbutyl-phenyl)-4,4' biphenyl phosphonite) or Ultranox 626 (bis(2,4-di-t-butylphenyl)pentaerythritol diphosphite) or 627A (Ultranox 626+MgAlCO$_3$).

American application US 2003/0225194 A1 describes the stabilization of a polyolefin by a mixture of stabilizers, composed of a phenolic derivative and two phosphites, one of which may be Ultranox 626 or Ultranox 627.

Application US 2005/0113494 A1 describes the stabilization of a polyolefin with the aid of a mixture of two phosphites, one of which is said to be of high activity.

Application EP 1616907 A1 describes a masterbatch based on a fluoropolymer and an interfacial agent that is used as an extrusion agent for polyolefins.

Application US 2005/0010644 describes an extrusion agent that is a PEG that contains no fluoropolymer. The extrusion agent is used for the extrusion of a polyolefin, which can comprise at least a stabilizer. The stabilizer is incorporated in the polyolefin and not in the extrusion agent.

Not one of these documents describes the composition like defined by claim 1.

SUMMARY OF THE INVENTION

Figure 1:
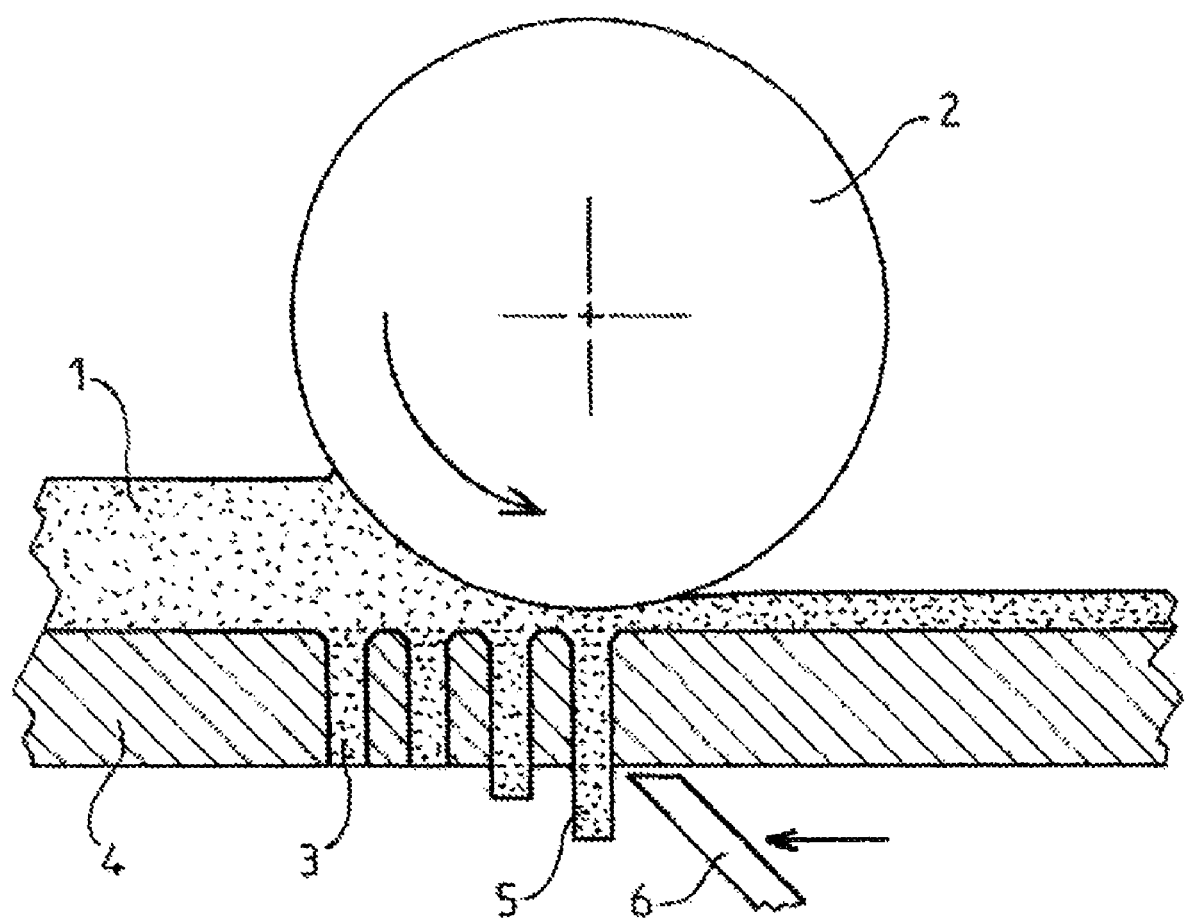
FIG. 1 illustrates the operation of a pelleting press. The product or mixture of products to be pelleted forms a layer 1 that is constantly crushed by the roller 2, that is to say precompressed and pressed into the compression channels 3 of the perforated die 4. A cylindrical pellet 5 then leaves below the die 4. A cutting device 6, situated below the die 4, enables pellets to be obtained with the desired length.

The invention relates to a composition comprising:
at least one fluoropolymer (A),
at least one interfacial agent (B),
at least one stabilizer (C) of formula (I)

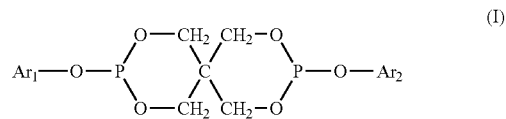

in which Ar$_1$ and Ar$_2$ denote an aryl group.
Preferably, the stabilizer (C) has for formula (II):

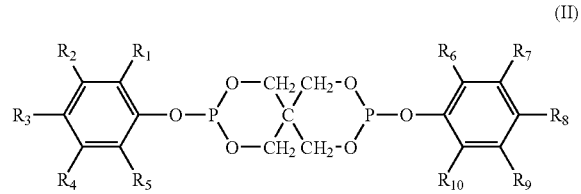

in which R$_1$, R$_2$, R$_3$, R$_4$, R$_5$, R$_6$, R$_7$, R$_8$, R$_9$ and R$_{10}$ denote (independently of each other) a hydrogen atom, a linear or branched alkyl group with C$_1$-C$_{20}$, preferably with C$_4$-C$_{10}$, or an aryl group.
And more particularly of formula (III):

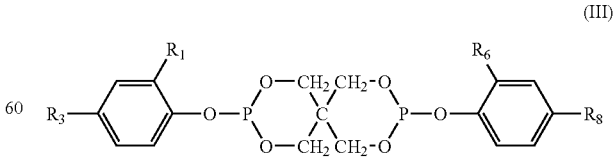

in which R$_1$, R$_3$, R$_6$ and R$_8$ each denotes an alkyl group with C$_1$-C$_{20}$, preferably with C$_4$-C$_{10}$, or an aryl group.
The composition is used as an extrusion agent for a polyolefin or a thermoplastic resin.

The invention also relates to an extrusion method consisting of:
(i) putting a composition in the solid state as defined in any one of claims 1 to 13 into contact with a polyolefin or a thermoplastic resin;
(ii) then extruding the mixture obtained in (i) in the form of a film, a tube, a profile or a hollow body.

DETAILED DESCRIPTION OF THE INVENTION

As regards the fluoropolymer (A), any polymer is denoted in this way having in its chain at least one monomer chosen from compounds containing a vinyl group capable of opening in order to polymerize and which contains, directly attached to this vinyl group, at least one fluorine atom, a fluoroalkyl group or a fluoroalkoxy group.

As an example of a monomer, mention may be made of vinyl fluoride, vinylidene fluoride (VDF, $CH_2=CF_2$); trifluoroethylene ($VF_3$); chlorotrifluoroethylene (CTFE); 1,2-difluoroethylene; tetrafluoroethylene (TFE); hexafluoropropylene (HFP); and perfluoro(alkyl vinyl) ethers.

The fluoropolymer may be a homopolymer or a copolymer, and it may also comprise non-fluorinated monomers such as ethylene or propylene.

As an example, the fluoropolymer is chosen from:
homo- and copolymers of vinylidene fluoride (VDF), preferably containing at least 50% by weight of VDF, the comonomer being chosen from chlorotrifluoroethylene (CTFE), hexafluoropropylene (HFP), trifluoroethylene (VF3) and tetrafluoroethylene (TFE);
homo- and copolymers of trifluoroethylene (VF3);
copolymers, and particularly terpolymers, associating chlorotrifluoroethylene (CTFE), tetrafluoroethylene (TFE), hexafluoropropylene (HFP) and/or ethylene unit residues and optionally VDF and/or VF3 units;
terpolymers of TFE, HFP and VDF;
copolymers of TFE, propylene and optionally VDF.

It will be possible for the fluoropolymer to be for example a terpolymer comprising by weight 30 to 70% TFE, 10 to 30% HFP and 5 to 50% VDF or else comprising by weight 45 to 65% TFE, 10 to 20% HFP and 15 to 35% VDF as described in U.S. Pat. No. 6,734,252 B1. It may also consist of the fluoropolymers described in U.S. Pat. No. 6,380,313 B1, particularly terpolymers comprising a perfluorovinylether, VDF and HFP. Other examples of fluoropolymers are given in column 6—lines 1-42 of U.S. Pat. No. 6,277,919 B1.

Advantageously, the fluoropolymer is a polyvinylidene fluoride (PVDF) homopolymer or copolymer. It has, in point of fact, a suitable viscosity in the transformation range of many thermoplastic resins. Preferably, better effectiveness of the extrusion agent is obtained when the PVDF contains, by weight, at least 50%, more preferably at least 75% and better still at least 85% VDF. Preferably, better effectiveness of the extrusion agent is obtained when the PVDF is of the thermoplastic type. The comonomer is advantageously HFP. Even more preferably, the copolymer will only comprise VDF and HPF as monomers.

Advantageously, the PVDF has a viscosity extending from 100 Pa·s to 4000 Pa·s, the viscosity being measured at 230° C., at a shear gradient of 100 $s^{-1}$ with the aid of a capillary rheometer. The PVDF preferably has a viscosity extending from 1000 Pa·s to 2500 Pa·s, the viscosity being measured at 230° C., at a shear gradient of 100 $s^{-1}$ with the aid of a capillary rheometer.

Thus, PVDFs marketed under the name Kynarflex® are perfectly suitable for this formulation and this method.

As regards the interfacial agent (B), this denotes any product which, when mixed with (A), improves the effectiveness of the masterbatch as an extrusion agent. As an example of the interfacial agent (B), mention may be made of:
a) silicones;
b) silicone-polyether copolymers;
c) aliphatic polyesters, such as polybutylene adipate, polylactic acid and polycaprolactones;
d) aromatic polyesters, such as for example phthalic acid diisobutyl ester;
e) polyethers, such as for example polyether polyols and alkylene polyoxides, as for example defined in U.S. Pat. No. 4,855,360;
f) amine oxides, such as for example octyldimethylamine oxide;
g) carboxylic acids, such as for example hydroxybutanedioic acid;
h) fatty acid esters such as sorbitan monolaurate.

Without being bound by any one interpretation, it is possible that the function of the interfacial agent (B) is to stabilize the fluoropolymer (A). It interacts physically or chemically with the fluoropolymer (A).

Advantageously (B) is a polyether, preferably chosen from amongst oligomers or polymers having alkylene oxide functional groups (for example ethylene or propylene oxide) or a polycaprolactone. Mention may be made by way of example of polyoxyethylene glycol, commonly called polyethylene glycol (PEG). Advantageously, the number-average molecular weight $\overline{Mn}$ lies between 400 and 15 000 g/mol (this may for example be determined with the aid of viscosity measurements) and the melting point lies between 50 and 80° C. As an example of PEG, mention may be made of Pluriol E® from BASF or Polyglykol® from Clariant. The use of a mixture of two or more polyethers will not fall outside the scope of the invention.

These PEGs and other examples of PEGs are described in patents U.S. Pat. No. 5,587,429 and U.S. Pat. No. 5,015,693. Thus, mention may be made of:
the polyethylene glycol of formula $H(OC_2H_4)_nOH$ where n is an integer close to 76, between 70 and 80;
$H(OC_2H_4)_d[OCH(CH_3)CH_2]_e(OC_2H_4)_fOH$ where d, e and f denote integers with d+f close to 108, between 100 and 110, and e close to 35, between 30 and 40;
Carbowax® 3350 having a number-average molecular weight of approximately 3500 g/mol;
Carbowax® 8000 having a number-average molecular weight of approximately 8000 g/mol;
Polyglycol® 8000 from Clariant, having a number-average molecular weight of between 7000 and 9000 g/mol.

The polycaprolactone preferably has a number-average molecular weight of between 1000 and 32 000, preferably between 2000 and 10 000, and even more preferably between 2000 and 4000 g/mol.

As regards the stabilizer (C), this corresponds to a compound of formula (I):

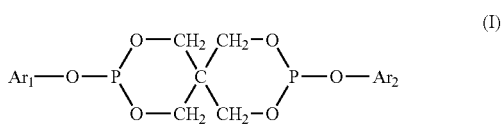

In which $Ar_1$ and $Ar_2$ denote an aryl group.

Preferably, (C) has for formula (II):

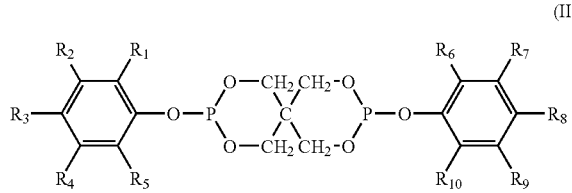

(II)

in which $R_1$, $R_2$, $R_3$, $R_4$, $R_5$, $R_6$, $R_7$, $R_8$, $R_9$ and $R_{10}$ denote (independently of each other) a hydrogen atom, a linear or branched alkyl group with $C_1$-$C_{20}$, preferably with $C_4$-$C_{10}$, or an aryl group.

Preferably, (C) has for formula (III):

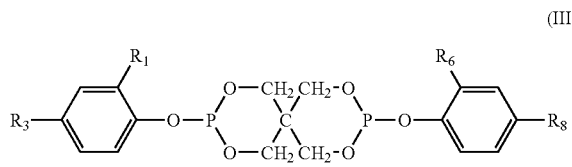

(III)

in which $R_1$, $R_3$, $R_6$ and $R_8$ each denotes an alkyl group with $C_1$-$C_{20}$, preferably with $C_4$-$C_{10}$, or an aryl group.

As examples of stabilizers, mention may be made of Ultranox 626 from GE Specialty Chemicals (bis(2,4-di-t-butylphenyl) pentaerythritol) of CAS No 26741-53-7, Doverphos S-9228 from Dover Chemical (bis(2,4-dicumylphenyl) pentaerythritol) of CAS No 154862-43-8, and PEP-36 from Amfine Chemical Corporation (bis(2,6-di-tert-butyl, 4-methylphenyl)pentaerythritol) of CAS No 80693-00-1. Ultranox 626 has been successfully evaluated, as the following examples show.

In order to reinforce its effectiveness, the stabilizer (C) may be associated with other stabilizers, such as for example a phenolic derivative or a lactone. Several stabilizers (C) may also be associated.

As regards the polyolefin that is extruded in the presence of the extrusion agent, this may be:
- a polyethylene, in particular a low density polyethylene (LDPE), a high density polyethylene (HDPE), a medium density polyethylene, a linear low density polyethylene (LLDPE), or an ultra-high density polyethylene (UHDPE). It may consist of a polyethylene obtained with the aid of a catalyst of the metallocene type or more generally a catalyst termed a "monosite" catalyst or a catalyst of the Phillips type or a catalyst of the Ziegler-Natta type;
- a polypropylene, in particular an iso- or syndiotactic polypropylene;
- a bioriented polypropylene;
- a polybutene (obtained from butene-1);
- a poly(3-methyl butene) or a poly(4-methyl pentene).

There will be no departure from the scope of the invention in the case of the extrusion of a mixture of two or more polyolefins, for example a mixture of an LLDPE and an LDPE.

The extrusion agent is particularly valuable for polyethylenes with a high molecular weight and/or those having a narrow molecular weight distribution (typically such that the polymolecularity index is less than 3, preferably less than 2.5, and better still less than 2.2). It is particularly useful for the extrusion of a polyolefin, particularly a polyethylene, in film form.

The extrusion agent is also well suited in the case of polyolefins which contain an acid captor such as for example hydrotalcite. The Applicant has in point of fact found that the presence of hydrotalcite in a polyolefin leads to significant yellowing in the presence of an extrusion agent based on a fluoropolymer with or without an interfacial agent. The stabilizer (C) of the invention makes it possible to prevent significant yellowing.

The extrusion agent may also be used for the extrusion of other thermoplastic resins such as for example a styrene resin, a polyester or a PVC. A styrene resin denotes a homopolystyrene or a copolymer of styrene containing at least 50% by weight of styrene. It may consist of a crystal polystyrene, a high-impact polystyrene, an acrylonitrile-butadiene-styrene (ABS) copolymer or a sequenced copolymer, for example a copolymer comprising styrene and a diene. The polyester may for example be polyethylene terephthalate (PET) or polybutylene terephthalate (PBT).

The polyolefin or thermoplastic resin may also contain dispersed organic or inorganic particles. The inorganic filler may for example be silica, alumina, a zeolite, titaniuim oxide, a carbonate, (for example sodium, potassium or calcium carbonate), hydrotalcite, talc, zinc oxide, magnesium or calcium oxide, diatomaceous earth, carbon black, etc. It may also consist of an inorganic pigment. The organic particles may for example be those of an organic pigment, an antioxidant or a stearate.

As regards the extrusion agent, this comprises at least one fluoropolymer (A) at least interfacial agent (B) and at least one stabilizer (C). (A), (B) and (C) are optionally diluted with a polyolefin (D) in the form of a masterbatch. Preferably, in order to maintain its good efficiency, the extrusion agent does not comprise any inorganic filler, in particular no magnesium oxide, and no polyolefin.

The respective proportions of (A) and (B) by weight may be such that (A)/(B) lies between 10/90 and 90/10, preferably between 30/70 and 70/30 and better still between 30/70 and 60/40. The proportion by weight of (C) with respect to (A) and (B) varies from 0.1 to 20 parts of (C) for 80 to 99.9 parts of (A) and (B).

When (A), (B) and (C) are diluted with a polyolefin (D) to give the masterbatch, the proportion by weight of (A), (B) and (C) varies from 0.1 to 30% preferably from 1 to 10%, preferentially from 1.5 to 10% and even more preferably from 2 to 10% for 70 to 99% respectively, preferably 90 to 99%, preferentially 90 to 98.5%, and even more preferably from 90 to 98% of (D).

The extrusion agent is prepared by mixing (A), (B) and (C). This mixture may then be used as it is or may be diluted with a polyolefin (D) in the form of a masterbatch. The extrusion agent is in the form of a powder or pellets. The method for obtaining the extrusion agent thus comprises:
- a step (i) for mixing (A), (B) and (C);
- an optional step (ii) for diluting the mixture of step (i) with a polyolefin (D).

The mixing step (i) may be carried out with the aid of any mixing means suitable for thermoplastic materials, such as for example an extruder or a blender. It may also be possible to mix the three components in the form of powders. It is also possible advantageously to use the compacting technique. This consists of introducing the products to be mixed in the form of powders in a pelleting press and then of forcing the mixture through a die. FIG. 1 shows diagrammatically the operating principle of a pelleting press. This apparatus is often used in the food processing industry for preparing animal feed pellets from powdered substances. An example of a pelleting press will be found for example in EP 0 489 046.

The pelleting press comprises a rotating roller which compresses/mixes the powders, and then the mixture which is formed, is pressed inside compression channels of the perforated die so as to form a cylindrical pellet which is then cut up with the aid of a cutting device situated under the die. The internal friction produced as the powders are mixed in the press makes it possible to exceed the melting point of the interfacial agent (B).

Preferably, and surprisingly, good effectiveness is obtained when the mixture is produced so that (A) is solid and (B) is molten in its mass or at its surface. Preferably, the temperature at which (A) and (B) are mixed is chosen so that (B) does not have too low a viscosity. The temperature is chosen so that:
the interfacial agent (B) is in the molten state in its mass or at its surface and
the fluoropolymer (A) is in the solid state.

The interfacial agent is said to be molten in its mass when it is entirely liquid. It is said to be molten at its surface when the particles of the interfacial agent are covered by a molten surface layer and are solid in their core. The compacting technique is well suited to this but it is also possible to use an extruder operating at judiciously chosen and controlled zone temperatures.

Step (i) is preferably carried out at a temperature between 10 and 120° C., advantageously between 20 and 100° C., preferably between 40 and 100° C. and even more preferably between 60 and 100° C. By operating in this way, it has been found that better effectiveness has been obtained than when operating at a temperature such that (A) and (B) are both in the molten state. A temperature below 120° C. makes it possible to avoid thermally degrading the interfacial agent (B) which could affect its effectiveness in the mixture or lead to yellowing. In order to promote intimate mixing, it is preferable for the fluoropolymer (A) to be in powder form, that is to say in a dispersed form.

Without being bound by any particular theory, it is possible that the better effectiveness of the extrusion agent compared with other solutions is linked to the fact that (A) and (B) interact physically and/or chemically during step (i). This way of operating is more effective than that consisting for example of adding a masterbatch of (A) and a masterbatch of (B) to the thermoplastic resin, for which contact between (A) and (B) is not as good before there is contact with the thermoplastic resin. It is also more effective than the method consisting of introducing (A) and (B) separately.

Step (ii) may be carried out in any equipment for mixing plastics known to a person skilled in the art. It may consist for example of an extruder or a blender. It preferably consists of an extruder.

Advantageously for the extrusion of a polyolefin, a polyolefin (D) is chosen with the same nature, that is to say it consists for example of two polyethylenes or two polypropylenes preferably having viscosities that are not very far apart.

[Use]

The extrusion agent is used to reduce or eliminate surface defects that appear during extrusion of the thermoplastic resin. It significantly reduces the time taken to obtain a stable defect-free extrusion within a range of extrusion parameters where considerable extrusion instabilities are normally exhibited. Since it is more effective than other extrusion agents already marketed, the extrusion agent of the invention makes it possible to reduce the quantity to be added with respect to the resin to be extruded while preventing yellowing thereof.

The yellowing as result after an extrusion could be connected to the degradation of the extruded resin and/or the fluoropolymer and/or the interfacial agent. It has been certainly known to use one of the stabilizers (C) of the invention for stabilizing the to be extruded resin but this can not avoid under certain extrusion conditions a yellowing due to the degradation of the fluoropolymer and/or the interfacial agent. In fact, even if the extruded resin is stabilized, the extrusion agent is not incorporated in a homogenous manner in the resin in the first mixing zones of the extruder and the stabilizer of the extruded resin is not efficient for stabilizing the fluoropolymer and/or the interfacial agent.

The extrusion agent is particularly useful for extruding a film or for extrusion in the form of a tube, a profile or a hollow body etc. Apart from the advantages already mentioned, it makes it easier to obtain a smooth, defect-free surface, which is particularly important in the case of a film where good optical properties are to be obtained. The extrusion agent also makes it possible to reduce the pressure in the region of the gap of the die as well as the amount of gels. It also makes it possible, to a certain extent, to reduce deposits at the outlet from the die. The extrusion agent is used in the form of pellets or in the form of a powder.

The extrusion agent and the polyolefin or the thermoplastic resin are put into contact in the solid state before extrusion. They may be premixed in the solid state or simply introduced into the hopper of the extruder. The extrusion agent may also be introduced in the molten state at any point of the extruder which serves to extrude the thermoplastic resin, for example with the aid of a lateral extruder. The invention also relates to an extrusion method which consists of:
(i) putting the extrusion agent of the invention into contact in the solid state with the polyolefin or the thermoplastic resin;
(ii) then extruding the mixture obtained in (i) in the form of a film, a tube, a profile or a hollow body.

This method makes it possible to reduce extrusion defects without harming the YI of the polymer that is extruded.

The proportion of extrusion agent to be introduced into the polyolefin or thermoplastic resin is advantageously such that the quantity of (A)+(B) in relation to the polyolefin or thermoplastic resin is of the order of 30 ppm to 100 000 ppm, advantageously from 50 to 5000 ppm, preferably 100 to 1000 ppm.

EXAMPLES

Products

The following products were used:
HDPE: of density 0.948 g/cc, melt-flow 0.6 g/10 min (190° C., 2.16 kg) and with the addition of 2000 ppm of Irgafos 168 and 400 ppm of hydrotalcite DHT-4A.
LLDPE: Innovex LL0209AA: it consists of a linear low density PE with butene as a comonomer, of density 0.920 g/cc, melt-flow 0.9 g/10 min (190° C., 2.16 kg).
PPA-1: a VDF-HFP (11% by weight HFP) homogeneous PVDF, with a melting point of 140-145° C. and a viscosity of 1600 Pa s (230° C., 100 s$^{-1}$).
PPA-2: a mixture obtained by compaction and consisting, by weight, of:
55% of a VDF-HFP (10% by weight HFP) PVDF with a melting point of 166° C. and a viscosity of 2350 Pa s (230° C., 100 s$^{-1}$).
45% of a PEG, with a molar mass close to 8000 g/mol, sold by Clariant under the name Polyglykol 8000P.

PPA-3: a mixture obtained by compaction and consisting of, by weight:
- 49.5% of a VDF-HFP (10% by weight HFP) PVDF with a melting point of 166° C. and a viscosity of 2350 Pa s (230° C., 100 s$^{-1}$).
- 40.5% of a PEG, with a molar mass close to 8000 g/mol, sold by Clariant under the name Polyglykol 8000P.
- 10% of an antioxidant, sold by GE Specialty Chemicals under the name Ultranox 626.

PPA-4: Viton Z100, an extrusion agent sold by Dupont-Dow
PPA-5: Viton Z200, an extrusion agent sold by Dupont-Dow
MB-1 to MB-5: each PPA above was incorporated in a masterbatch denoted by MB-i (with i=1-5) and containing 5% by weight of PPA-i and 95% by weight of LLDPE. These masterbatches were prepared on a Haake-2 twin-screw extruder, using a 200-220-190-190° C. temperature profile and a screw speed of 170 rpm.

EXAMPLES

Each test was carried out on a Haake-2 twin-screw extruder, at 220° C., with the hopper flushed with nitrogen.

Example-1

Comparative

HDPE was extruded on its own under the above conditions and led to pellets with a YI measured at 7.6.

Example-2

Comparative a mixture of 98% by weight of HDPE and 2% by weight of MB-1 was prepared by dry mixing and was then extruded under the above conditions and led to pellets having a YI measured at 14.6.

Example-3

Comparative a mixture of 98% HDPE and 2% MB-2 was prepared by dry mixing and was then extruded under the above conditions and led to pellets having a YI measured at 10.3.

Example-4

According to the Invention a mixture of 98% HDPE and 2% MB-3 was prepared by dry mixing and was then extruded under the above conditions and led to pellets having a YI measured at 8.6.

Example-5

Comparative a mixture of 98% HDPE and 2% MB-4 was prepared by dry mixing and was then extruded under the above conditions and led to pellets having a YI measured at 10.8.

Example-6

Comparative a mixture of 98% HDPE and 2% MB-5 was prepared by dry mixing and was then extruded under the above conditions and led to pellets having a YI measured at 9.3.

TABLE I

| Example | MB-i | PPA content (ppm) | YI |
| --- | --- | --- | --- |
| 1 (comparative) | none | 0 | 7.6 |
| 2 (comparative) | 1 | 1000 | 14.6 |
| 3 (comparative) | 2 | 1000 | 10.3 |
| 4 (according to the invention) | 3 | 1000 | 8.6 |
| 5 (comparative) | 4 | 1000 | 10.8 |
| 6 (comparative) | 5 | 1000 | 9.3 |

It was found that MB-3, which comprised Ultranox 626, made it possible to obtain a YI of 8.6 whereas an unstabilized extrusion agent gave a YI of 14.6.

The invention claimed is:

1. An extrusion agent consisting of:
   at least one fluoropolymer (A),
   at least one interfacial agent (B), wherein the interfacial agent (B) is selected from the group consisting of:
   a) silicones;
   b) silicone-polyether copolymers;
   c) aliphatic polyesters, polybutylene adipate, polylactic acid and polycaprolactones;
   d) aromatic polyesters, phthalic acid diisobutyl ester;
   e) polyethers, polyether polyols and polyalkylene oxides;
   f) amine oxides, octyldimethylamine oxide;
   g) carboxylic acids, hydroxybutanedioic acid;
   h) fatty acid esters, and sorbitan monolaurate;
   at least one stabilizer (C) of formula (I)

$$Ar_1-O-P\underset{O-CH_2\phantom{x}CH_2-O}{\overset{O-CH_2\phantom{x}CH_2-O}{\diagup C \diagdown}}P-O-Ar_2 \quad (I)$$

in which $Ar_1$ and $Ar_2$ denote an aryl group.

2. The extrusion agent according to claim 1, wherein the stabilizer (C) has for formula (II):

(II)

[structure with $R_1, R_2, R_3, R_4, R_5$ on left aryl and $R_6, R_7, R_8, R_9, R_{10}$ on right aryl, connected via the same phosphite-pentaerythritol core as formula (I)]

in which $R_1, R_2, R_3, R_4, R_5, R_6, R_7, R_8, R_9$ and $R_{10}$ denote (independently of each other) a hydrogen atom, a linear or branched alkyl group with $C_1$-$C_{20}$, or an aryl group.

3. The extrusion agent according to claim 1, wherein the stabilizer (C) has for formula (III):

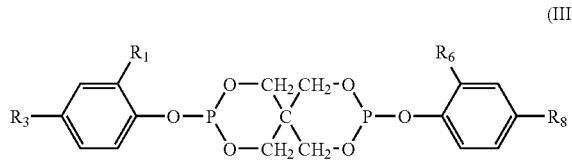 (III)

in which $R_1$, $R_3$, $R_6$ and $R_8$ each denotes an alkyl group with $C_1$-$C_{20}$, or an aryl group.

4. The extrusion agent according to claim 1, wherein the stabilizer (C) is bis(2,4-di-t-butylphenyl)pentaerythritol, bis(2,4-dicumylphenyl)pentaerythritol or bis(2,6-di-tert-butyl,4-methylphenyl)pentaerythritol.

5. The extrusion agent according to claim 1, wherein the fluoropolymer (A) is selected from the group consisting of:
 homo- and copolymers of vinylidene fluoride (VDF), the comonomer being chosen from chlorotrifluoroethylene (CTFE), hexafluoropropylene (HFP), trifluoroethylene (VF3) and tetrafluoroethylene (TFE);
 homo- and copolymers of trifluoroethylene (VF3);
 copolymers, and terpolymers, associating chlorotrifluoroethylene (CTFE), tetrafluoroethylene (TFE), hexafluoropropylene (HFP) and/or ethylene unit residues and optionally VDF and/or VF3 units;
 terpolymers of TFE, HFP and VDF; and
 copolymers of TFE, propylene and optionally VDF.

6. The extrusion agent according to claim 1, wherein the interfacial agent (B) is polyethylene glycol (PEG) or a polycaprolactone.

7. The extrusion agent according to claim 6, wherein the PEG has a number-average molecular weight $\overline{Mn}$ of between 400 and 15 000 g/mole.

8. The extrusion agent according to claim 6, wherein the polycaprolactone has a number-average molecular weight of between 1000 and 32 000 g/mol.

9. The extrusion agent according to claim 1, wherein the respective proportions of (A) and (B) by weight are such that (A)/(B) lies between 10/90 and 90/10.

10. The extrusion agent according to claim 1, wherein the proportion by weight of (C) with respect to (A) and (B) varies from 0.1 to 20 parts of (C) for 80 to 99.9 parts of (A) and (B).

11. The extrusion agent according to claim 1, wherein (A), (B) and (C) are diluted with a polyolefin (D).

12. The extrusion agent according to claim 11, wherein the proportion by weight of (A), (B) and (C) varies from 1 to 30%, for respectively 70 to 99% of (D).

13. The extrusion agent according to claim 1, wherein the mixture of (A), (B) and (D) is prepared in a compactor.

14. The extrusion agent according to claim 1 comprising a processing aid for a polyolefin or a thermoplastic resin.

15. The extrusion agent according to claim 14, wherein the thermoplastic resin is a styrene resin, a polyester or a PVC.

16. The extrusion agent according to claim 14, wherein the polyolefin contains an acid captor.

17. The extrusion agent according to claim 5, wherein the fluoropolymer (A) is a copolymers of vinylidene fluoride (VDF), containing at least 50% by weight of VDF.

* * * * *